United States Patent Office 3,509,762
Patented May 5, 1970

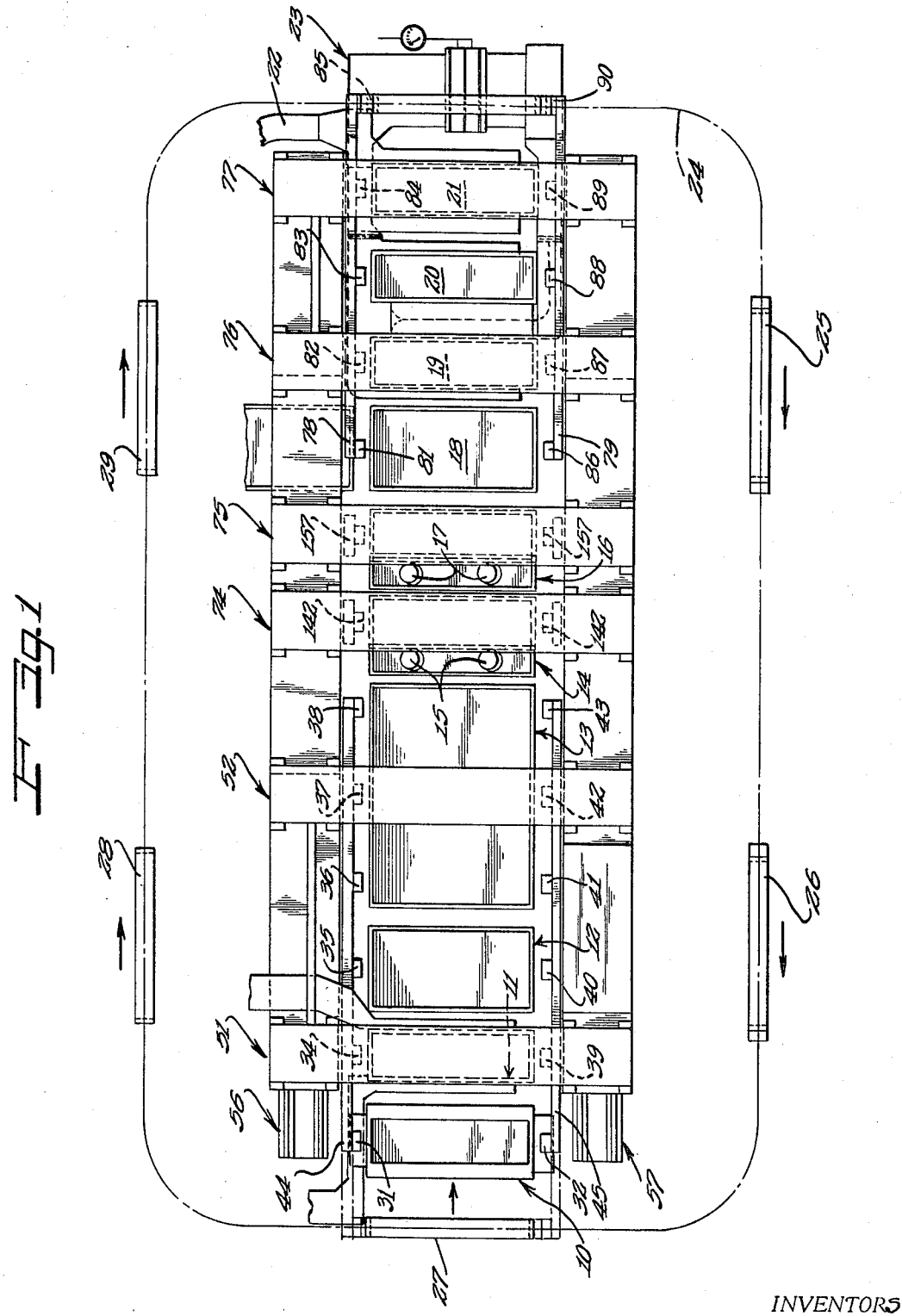

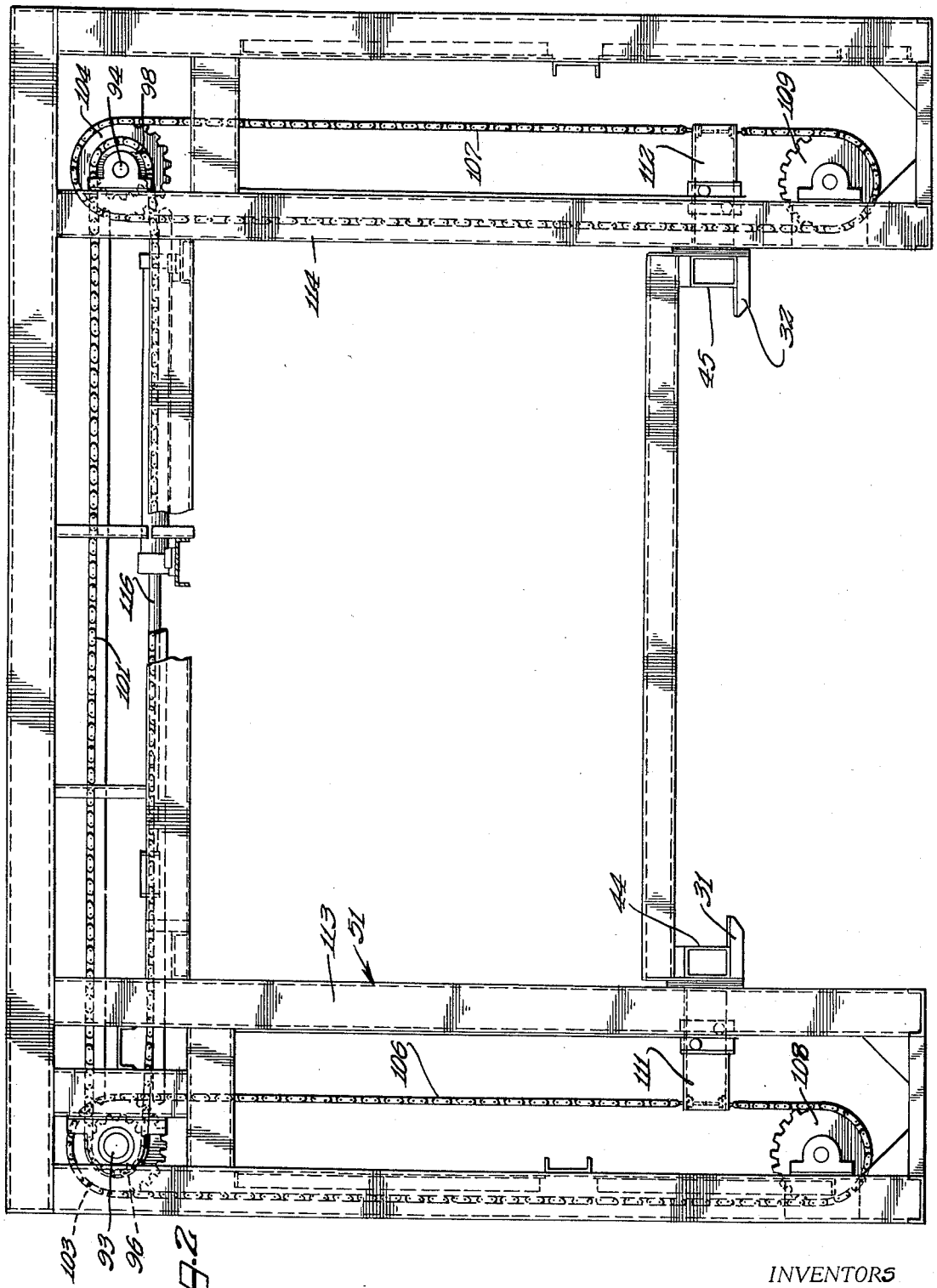

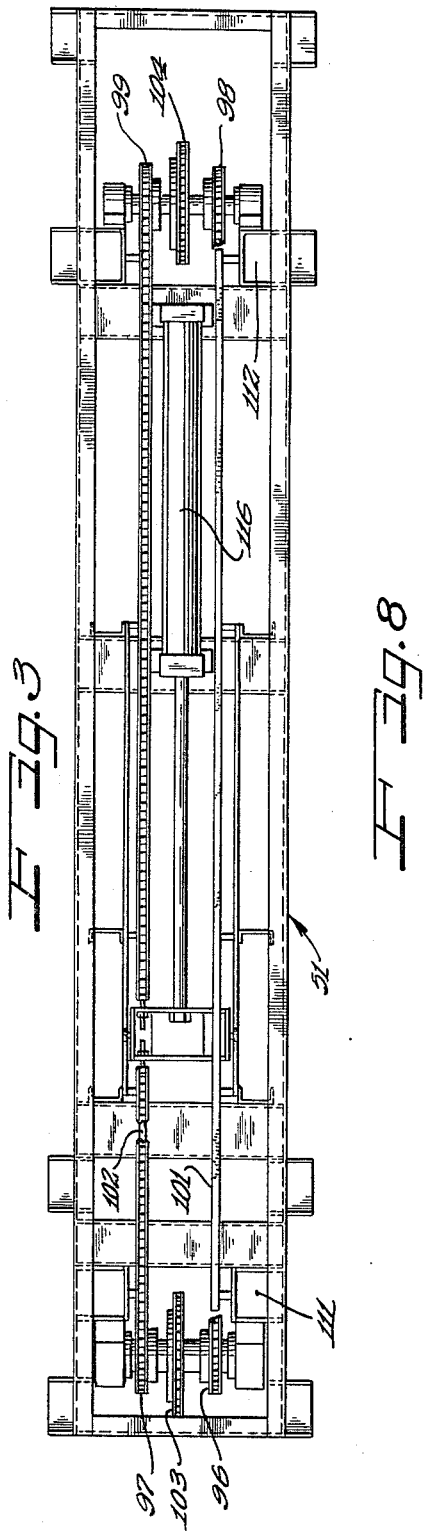
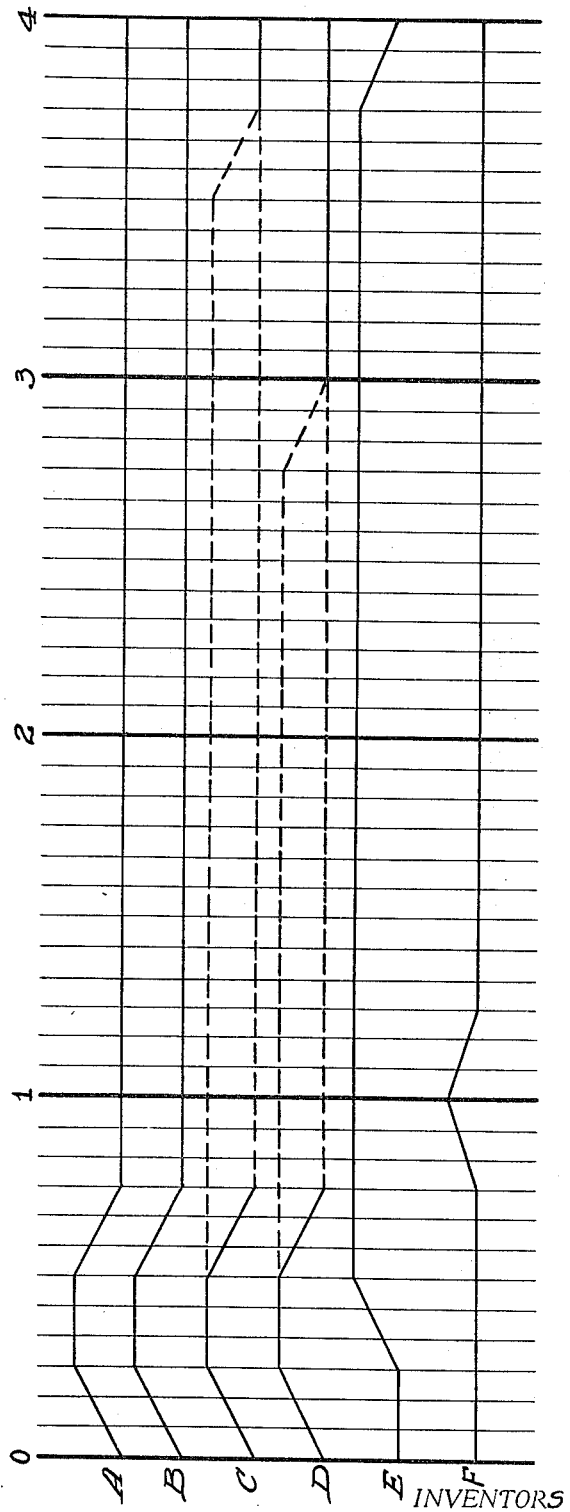

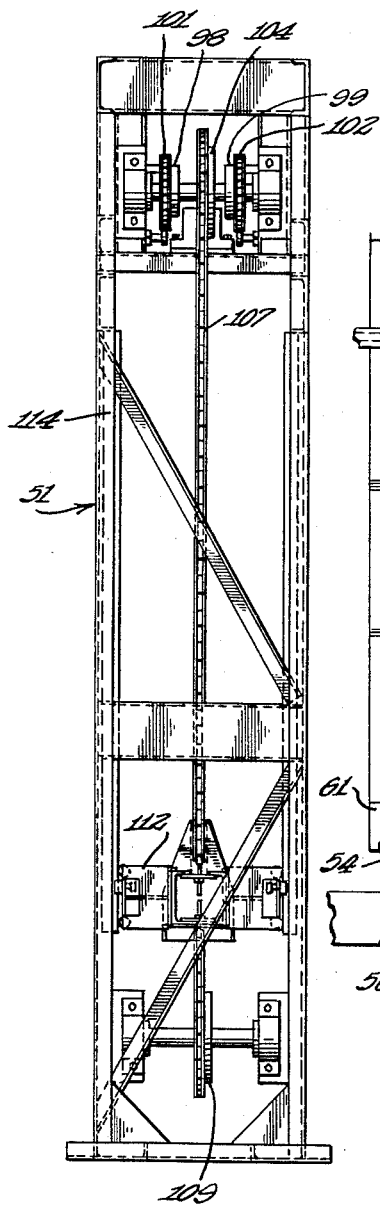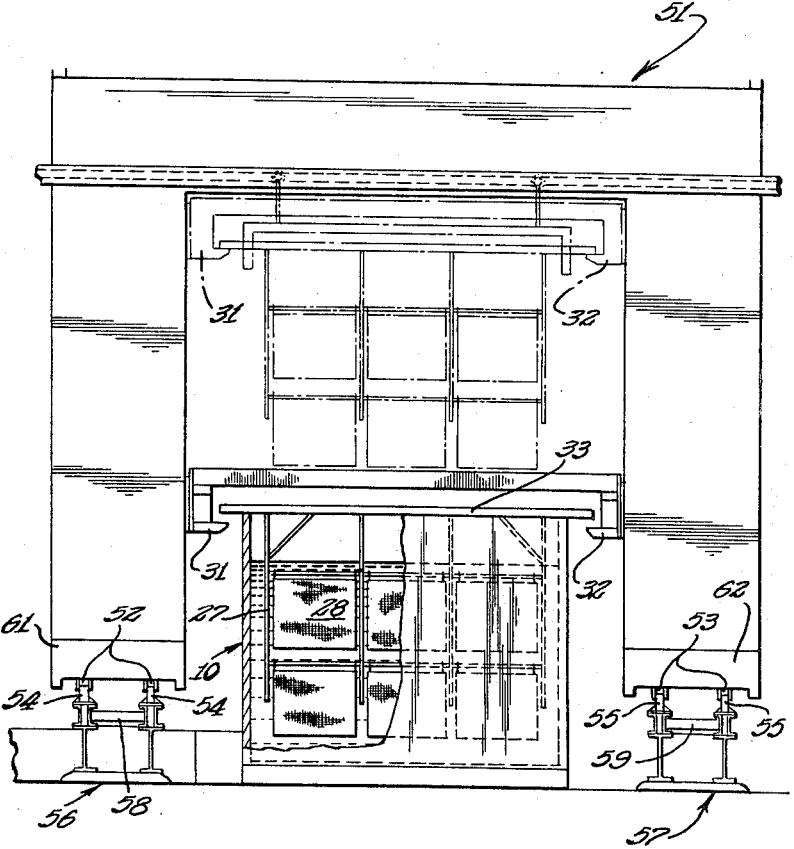

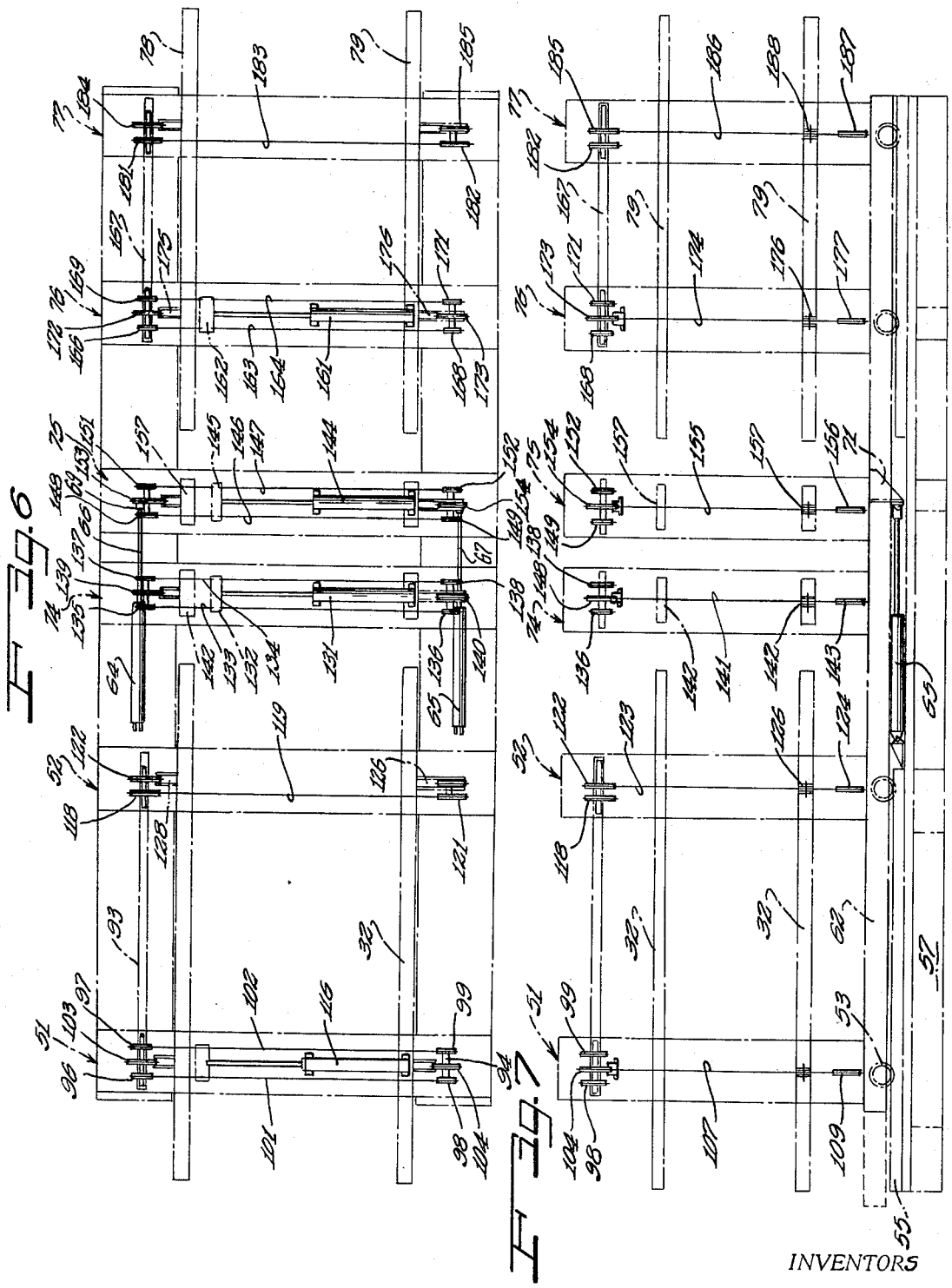

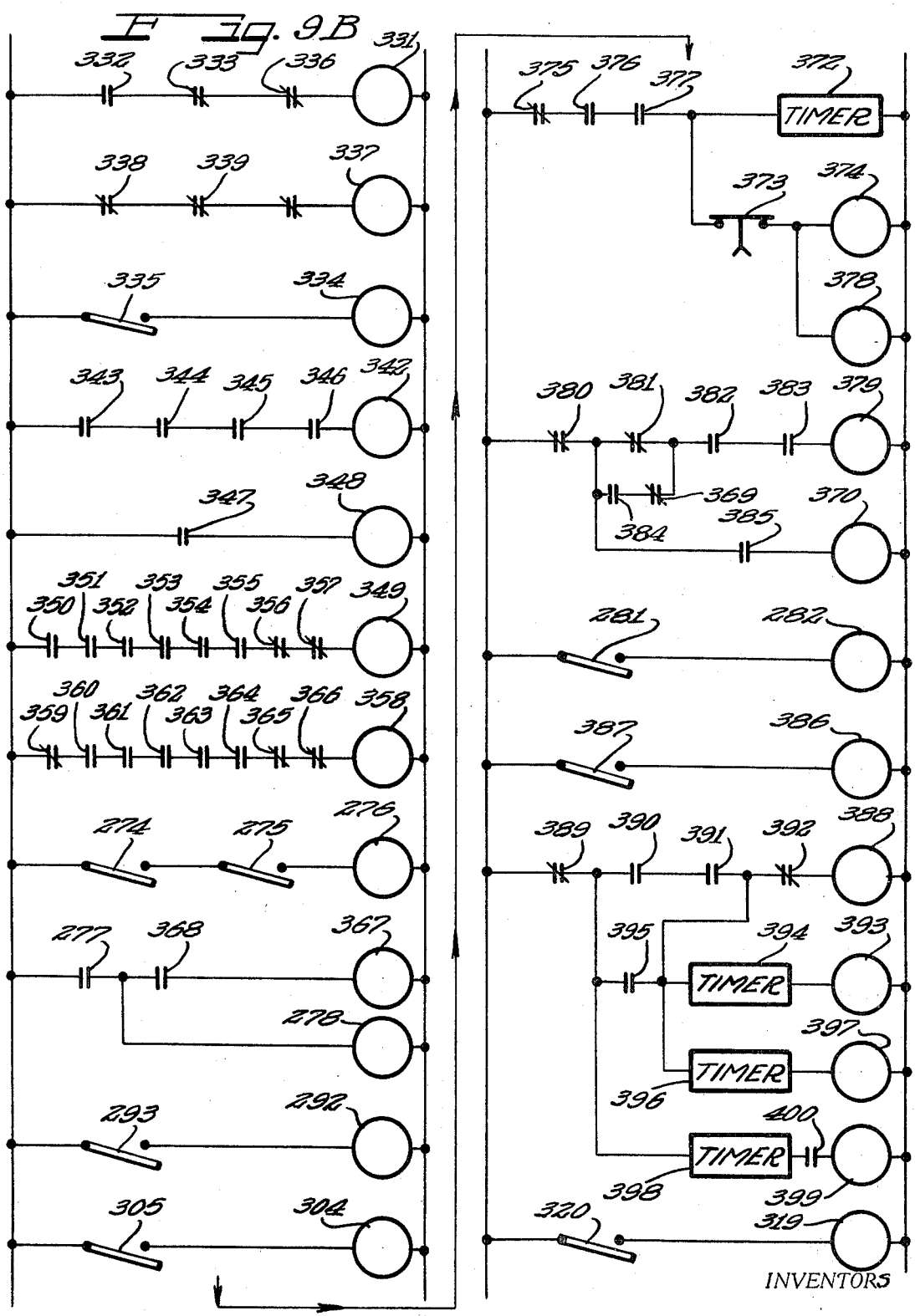

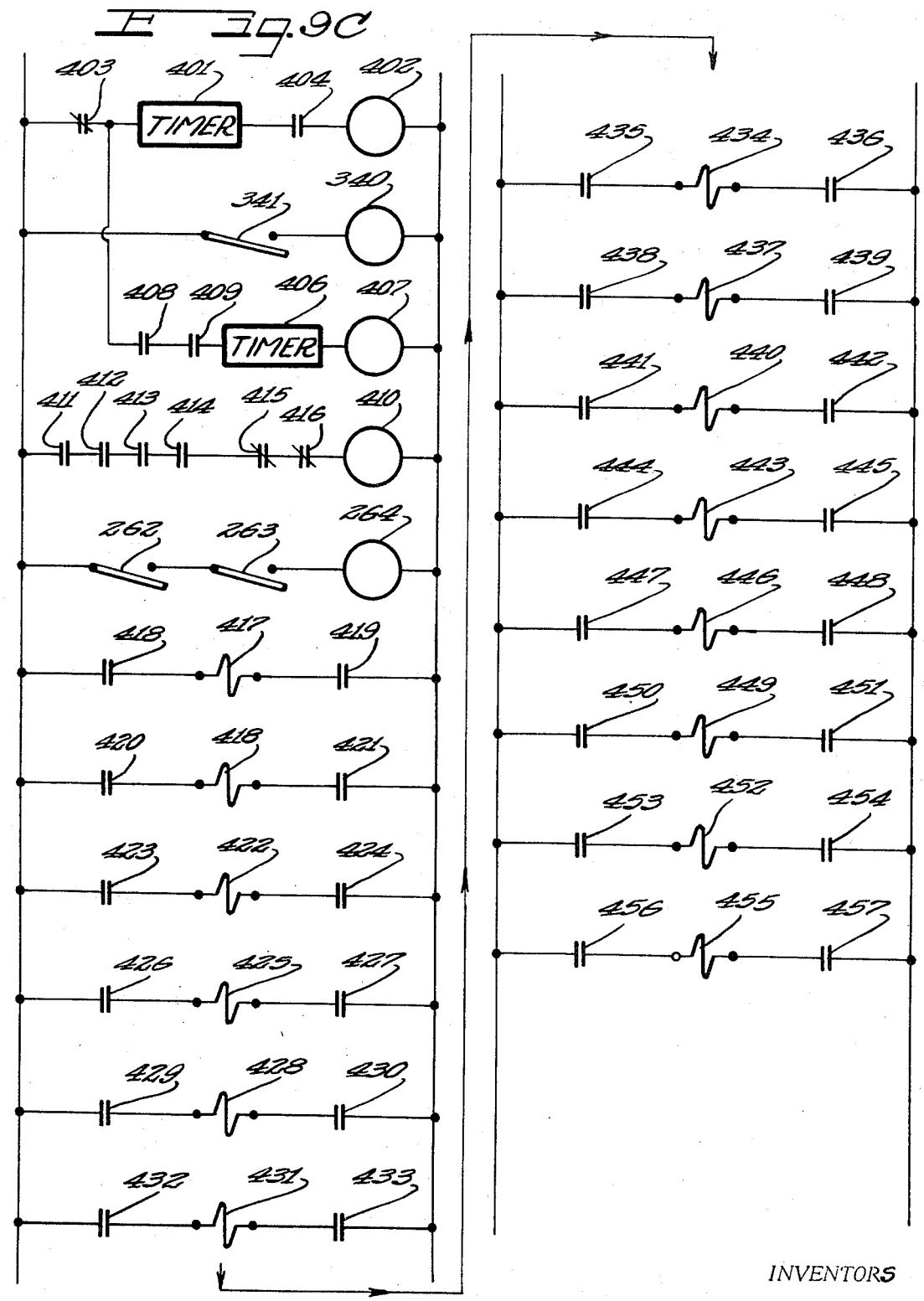

3,509,762
AUTOMATED SYSTEM FOR PROCESSING PARTS BY THE FLUORESCENT PENETRANT METHOD
Edward Frank Conway, Arlington Heights, and Kenneth Fry Conner, Lombard, Ill., assignors to Magnaflux Corporation, Chicago, Ill., a corporation of Delaware
Filed Aug. 2, 1967, Ser. No. 657,890
Int. Cl. G01n *19/02;* B05c *11/12*
U.S. Cl. 73—104
5 Claims

ABSTRACT OF THE DISCLOSURE

Apparatus for continuous processing of parts to be inspected by the technique of penetrant inspection wherein the parts to be inspected are delivered automatically to the various stages of the process, and means are provided to adjust the residence time of the parts in one or more of the stages without disrupting the overall operation.

BACKGROUND OF THE INVENTION

Field of the invention

The invention is in the field of apparatus for processing parts to be inspected by the post-emulsification technique involving the sequential steps of applying a penetrant to the surface of the part, draining off excess penetrant, applying an emulsifier or penetrant remover, rinsing after the penetrant has become solubilized, drying the part and finally applying a developer to the part to provide an indication of the location and size of any defects contained therein by the usual inspection system. These steps may be preceded by cleaning and drying of the part. The apparatus is arranged to be completely automatic except for loading and unloading the parts at the beginning and end of the sequence, with provision being made for adjusting the time which parts spend in certain stages of the sequence.

Description of the prior art

The overall method involved in detecting surface discontinuities forming the background of a preferred embodiment of the present invention will be found in U.S. Pat. No. 2,806,959 issued to De Forest and Parker. Briefly stated, the method involved proceeds as follows. After the test piece has been suitably cleaned, the surface is subjected to a liquid penetrant in such a manner that the penetrant can completely wet the surface and form a substantially continuous layer on it. After the excess penetrant has been allowed to drain off, a liquid emulsifier is applied in such a manner as to wet and spread over all the surfaces to which the penetrant has been applied. The excess liquid emulsifier is allowed to drain off for a predetermined drain interval. During this interval, there is substantially static contact between the layer of liquid emulsifier and the underlying layer of the penetrant. This contact exists for a sufficient period to effect an emulsification of the liquid penetrant layer at the interface between the emulsifier layer and the penetrant layer. The time, however, is insufficient to effect emulsification of that portion of the penetrant which has become lodged within a surface opening.

After the emulsification period, the part is washed to remove the emulsifier and the emulsified penetrant, while leaving the unemulsified penetrant in the surface defects. After suitable drying, the piece with the unemulsified penetrant still lodged within its surface defects is subjected to a developing operation, normally employing a developer powder whose function is to render the portion of penetrant remaining within the defect more visible. The powder is sufficiently finely divided to act as a wick and cause a liquid penetrant to be drawn up out of the surface defect by capillary action. Consequently, the colored penetrant wets and stains the particles of the developer powder which come in contact with the penetrant at the defect. Then, the piece is inspected under white light if a visible dye has been used in the penetrant, or under ultraviolet light if a fluorescent dye has been employed in the penetrant.

This type of inspection procedure has been widely used in industry with considerable success. As presently practiced, however, the process is essentially a hand operation, and considerable care has to be exercised on each piece to make sure that the proper emulsification time is used, that the parts are rinsed and dried properly, and that the dry developer powder is uniformly applied.

SUMMARY OF THE INVENTION

The apparatus of the present invention provides a means for carrying out all of the steps prior to the actual visual inspection of the test piece. The articles to be tested are automatically introduced into and withdrawn from the stages wherein they are cleaned, coated with penetrants, emulsified, rinsed, dried and developed, with the only manual handling required being that of loading the articles to be tested on a conveyor, and removing developed articles for inspection from the same conveyor. The movement of the various carriages which transport the pieces from stage to stage and which raise and lower the pieces into the stages is coordinated so that there is a continual movement of the pieces between the stages. Even though the residence time of the pieces in the various stages may vary, particularly the optimum emulsification time, means are provided to accommodate these variations without disrupting the continuity of the overall movement of pieces through the various stages. With the apparatus of the present invention, therefore, the parts are uniformly cleaned, treated with penetrant, emulsified, rinsed and developed, thereby providing a more uniform standard for evaluating the inspection results.

BRIEF DESCRIPTION OF THE DRAWINGS

FIG. 1 is a somewhat schematic plan view of the entire apparatus illustrating the sequence of operations involved;

FIG. 2 is a front elevational view of one of the tower assemblies illustrated in FIG. 1;

FIG. 3 is a plan view of the tower assembly of FIGURE 2;

FIG. 4 is a side elevational view of the tower assembly of FIG. 2;

FIG. 5 is a view in elevation at the loading end of the assembly;

FIG. 6 is a somewhat schematic plan view of the apparatus, with portions thereof removed to illustrate more particularly the manner in which the towers are moved;

FIG. 7 is an elevational view of the assembly of FIG. 6;

FIG. 8 is a timing chart illustrating the movements of the various conveying and lifting mechanisms during a single interval of operation of the machine; and FIGS. 9A, 9B, and 9C, combined, represent a schematic wiring diagram for the electrical circuitry involved.

DESCRIPTION OF THE PREFFERED EMBODIMENTS

Figure 9A:
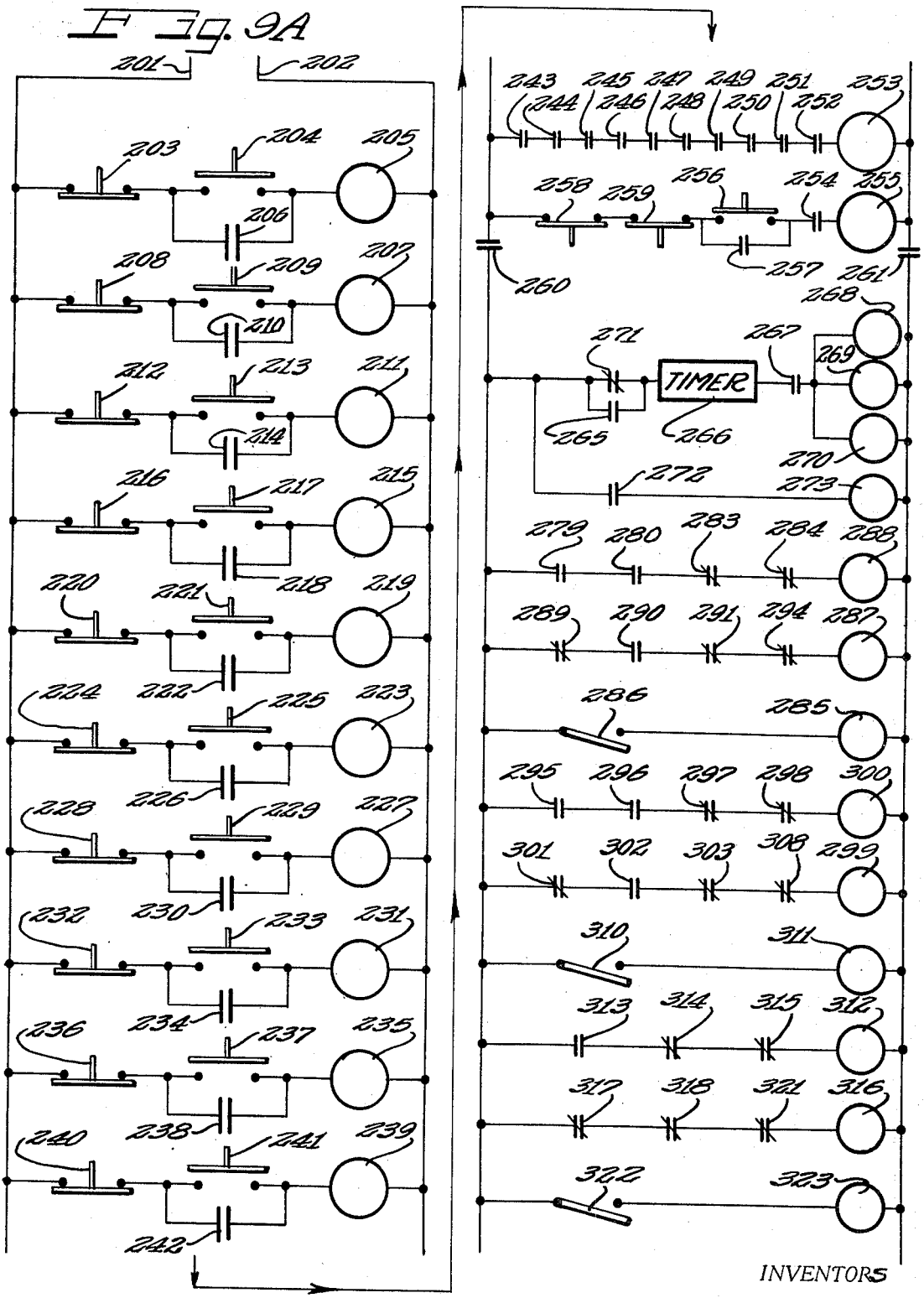

In FIG. 1, there is illustrated a machine embodying the improvements of the present invention, and including an ultrasonic cleaner tank 10 followed in turn by a dryer tank 11 and a tank 12 where the penetrant is sprayed or otherwise applied onto the articles to be processed. A relatively long penetrant drain tank 13 follows the spray penetrant applicator station in the direction of movement of the test pieces.

The next stage is an emulsifier dip station which includes a tank 14 equipped with agitators 15 extending toward the bottom of the tank. Next in succession is an agitated dip rinse station which includes a tank 16 equipped with a pair of agitators 17. Following this, there is a spray rinse station including a tank 18 which is succeeded by a pair of dryers 19 and 20. After the last drying step, the articles are conveyed to a tank 21 where a dry developer is applied as a cloud. A dust collector 22 is employed to remove excess particulate matter which does not coat the surface of the articles. An unload station, generally identified at reference numeral 23, is provided in conjunction with a monorail conveyor schematically indicated at reference numeral 24.

The articles to be treated are conveyed from station to station while supported on racks 25, 26 and 27. Rack 27 is shown positioned at the transfer or load station about to be picked up and immersed in the ultrasonic cleaner tank 10. Rack 25 is shown positioned at the load and unload station where a new rack is manually or automatically engaged with the monorail conveyor 24 during each interval of operation, and a rack is received from the unload end 23 with the parts thereon having the developer applied to them.

As the rack moves into the transfer station, it is picked up by a pair of lifter arms 31 and 32 into the position shown in dotted outline in FIG. 5 and then lowered into the ultransonic cleaner tank 10. The rack 27 and all of the other racks have a series of foraminous baskets 28 in which the test pieces to be treated are contained. The rack also has a top rail 33 of sufficient width so that it bridges across the tank 10, as shown in FIGURE 5, so that the parts contained in the baskets 28 are immersed within the liquid in the tank.

The lifter arms 31 and 32 are secured, together with spaced lifter arms 34, 35, 36, 37, 38, 39, 40, 41, 42 and 43 to a pair of lifter bars 44 and 45, as best seen in FIG. 1. The lifter bars 44 and 45 are secured between a pair of towers 51 and 52 which may be of identical construction and which are best shown in FIGS. 2 to 5, inclusive. As seen in FIG. 5, the tower 51 has spaced pairs of rollers 52 and 53 riding on spaced pairs of tracks 54 and 55, extending from spaced support frames 56 and 57. The frames, as illustrated, may include pairs of I-beams welded together and reinforced by longitudinally extending plates 58 and 59.

The rollers 52 and 53 are mounted for rotation within channels 61 and 62 which extend substantially the full length of the machine. A pair of stationary hydraulic cylinders 64 and 65 have shafts 66 and 67, respectively, connected to brackets 69 and 71 secured to the channels 61 and 62. Thus, movement of the pistons within the cylinders 64 and 65 serves to move the entire carriage lengthwise of the machine. In addition to towers 51 and 52, this carriage includes a tower 74 which controls the immersion and withdrawal of the baskets from the emulsifier dip station, a tower 75 which controls the immersion and withdrawal into the agitator and dip rinse section, and towers 76 and 77 which control movement of the parts into and out of the dryer and dry developer stages, respectively. Returning to FIG. 1, it will be seen that a pair of lifter bars 78 and 79 extend between and are secured to the towers 76 and 77, the lifter bars carrying spaced lifter arms 81 through 90, respectively, for raising and lowering the baskets into the appropriate treating chambers.

From what has been described thus far, it will be seen that the towers 51, 52, 74, 75, 76 and 77 move as a unit lengthwise of the machine whenever the hydraulic cylinders 64 and 65 are actuated.

Turning now to the means for raising and lowering the racks within the treating zones, and referring specifically to FIGS. 2, 3, 4, 6 and 7, it will be seen that a shaft 93 extends between the towers 51 and 52. A pair of sprockets 96 and 97 on the shaft 93 are connected to sprockets 98 and 99 mounted on a stub shaft 94 on the opposite side of the tower by means of a pair of chains 101 and 102, respectively. Between the sprockets 96 and 97 is a third sprocket 103, while an additional sprocket 104 is provided between the sprockets 98 and 99. The sprockets 103 and 104 carry chains 106 and 107 which are trained around a pair of lower sprocket wheels 108 and 109, respectively (FIG. 2). Connectors 111 and 112 couple the chains 106 and 107 to the lifter arms 31 and 32 which are received in sliding relation along channels 113 and 114 forming part of the tower structure 51.

Raising and lowering of the lifter arms 31 and 32 is accomplished by means of an hydraulic cylinder assembly 116, operated by a solenoid valve to be described in a succeeding portion of the specification.

Actuation of the hydraulic cylinder 116 also serves to rotate a sprocket 118 and, through a chain 119, to rotate a sprocket 121. The sprockets 118 and 121 are located within the tower 52. A sprocket 122 also in tower 52 is connected by means of a chain 123 to a lower sprocket 124, the chain 123 carrying a pair of brackets 126 and 128 to which are secured the lifting arms 32.

The towers 51 and 52 are thus tied together mechanically so that they not only move together along the length of the machine, but their raising and lowering mechanisms are also tied together so that they operate simultaneously. Thus, actuation of the cylinder 116 serves to operate both lifting mechanisms in towers 51 and 52.

In order to provide a variable time in the emulsifying dip tank 14, the lifting mechanism for the tower 74 is made independent of the other towers. There is accordingly provided a cylinder 131 in which a piston acts to move a connector 132 to the ends of which are connected a pair fo chains 133 and 134. The chains 133 and 134 run between opposed pairs of sprockets 135, 136 and 137, 138. Between these opposed pairs of sprockets are a pair of sprockets 139 and 140 and chains 141 extend between these sprockets and lower sprockets 143. The chains 141 carry a pair of lifting brackets 142, the vertical limits between which the lifting brackets move being illustrated in the dashed lines of FIG. 7.

Similarly, the tower 75 which controls immersion and withdrawal from the agitated dip rinse is provided with its own lifting system so that the interval in which the pieces are dipped into the tank 16 can be varied. An hydraulic cylinder 144 is mounted on the tower 75, and has a piston therein which is arranged to move a connector 145 to which the ends of a pair of chains 146 and 147 are connected. The chain 146 runs between horizontally spaced sprockets 148 and 149, while the chain 147 runs between horizontally spaced sprockets 151 and 152. Between the spaced pairs of sprockets are a pair of intermediate sprockets 153 and 154. Chains 155 run between these sprockets and vertically spaced sprockets 156 near the bottom of the tower. Lifter arms 157 are secured to the chains 155 to engage the rack and lower it to a suspended position within the tank 16 at the desired time interval.

A single actuating mechanism is provided for towers 76 and 77. This may take the form of an hydraulic cylinder 161 having a piston reciprocable therein and connected to a coupling 162 to which the ends of chains 163 and 164 are secured. The chain 163 runs between a sprocket 166 mounted on a shaft 167 and a sprocket 168, while the chain 164 runs between a sprocket 169 on the shaft 167 and a sprocket 171. An intermediate sprocket 172 is mounted on the shaft 167, while another intermediate sprocket 173 is mounted coaxially with the sprockets 168 and 171. Chains 174 are provided with brackets 175 and 176, the brackets being connected to the lifter bars 78 and 79, respectively. Chains 174 extend between the upper sprockets 172 and 173 and a corresponding pair of lower sprockets 177, one of which is shown in FIG. 6.

Within the tower 77, the shaft 167 connected to a sprocket 181 which in turn is connected to a sprocket 182 by means of a chain 183. Rotation of the sprockets 181 and 182 serves to rotate a second pair of sprockets 184 and 185 and, by means of chains 186 drive a pair of idler sprockets 187 which carry brackets 188 for raising and lowering the lifter arms 78 and 79.

The manner in which the various portions of the machine are synchronized is illustrated in the motion diagram of FIG. 8. For purposes of illustration, we will assume that each repeating interval of machine operation is exactly four minutes. Curves A to F, inclusive, of FIG. 8 then illustrate the actuation of the various devices within five second intervals of four minute increment. Curve A represents the movement of the load cylinder 116, while curve B, that of the unload cylinder 161. The zero time assumed is a condition where all of the lift bars are down when the carriage is at its extreme left position. During the first fifteen seconds then, the cylinder 116 and the cylinder 161 are actuated to raise lift bars 44, 45, 78 and 79, thereby raising the racks which have theretofore been lowered in the cleaner tank 10, the dryer 11, the spray penetrant tank 12, the penetrant drain tank 13, the spray rinse tank 18 and the two dryers 19 and 20. At the same time, the lifting arms 31 and 32 engage a rack 27 to begin its travel through the machine while the lift arms 85 and 90 lift a rack of finished pieces from developer station 21 to deliver it to the monorail conveyor 24.

Curve C represents the actuation chart for the cylinder 131 which controls operation in the emulsifier dip station, while curve D represents the motion diagram of the cylinder 144 which controls vertical movement of the part in the agitate dip rinse tank 16. Curve E is a motion diagram of the lateral movement of the carriage controlled by cylinders 64 and 65, while curve F is the motion diagram of the monorail conveyor 24. During the first fifteen second interval, it will be seen that all of the lifting mechanisms are actuated so that all of the racks are raised by the lifting bars from the various tanks and a new rack is ready to be received in the machine. At the completion of the fifteen second interval, the upward movement of the racks is stopped by suitable limit switches and the cylinders 64 and 65 are actuated as indicated in curve E to transport all of the towers laterally a distance equal to the distance between the center line of tank 10 and tank 11. At the conclusion of this lateral movement, again determined by suitable limit switches, the cylinders 116 and 161 are again actuated to lower the racks suspended on lift bars 44, 45, 78 and 79 into the next adjacent treating station. The parts may or may not be lowered into the emulsifier station or the dip rinse station at this time, as indicated by the dashed lines in curves C and D. The portion of the interval at which the parts about to be dipped into the emulsifier tank are so dipped, and the time at which the previously emulsified parts are subjected to a dip rinse operation are both at the control of the operator by electrical circuitry to be explained in a succeeding portion of the specification. Thus, as evident from curve C, the parts can be dipped into the emulsifier tank as early as the 45th second of the four minute interval, or they can be dipped as late as the three minute, forty-five second mark of the four-minute interval. Similarly, as shown in curve D, the parts can be placed in the dip rinse station at the forty-five second interval or as late as the three minute mark so there is a time variable of two minutes and fifteen seconds available.

At the completion of the downward movement of the racks in towers 51, 52, 76 and 77, the monorail conveyor is indexed as shown in curve F to advance each rack on station about the periphery of the machine as shown in FIG. 1. This puts a new rack into position to be received into the machine, and delivers a rack of treated articles to an unload station. The last movement in the four minute cycle is the lateral movement of the carriage to move the entire carriage to the left as seen in FIG. 1, thereby returning the machine to the condition which existed at the zero time interval.

An electrical circuit for initiating the operation of various elements in the machine has been illustrated in FIGS. 9A, 9B and 9C, collectively. For purposes of simplification, the circuits do not include the usual overload devices, nor do they illustrate the energization of the various drive motors which will normally be polyphase energizing systems of conventional type. The circuit diagrams of FIGS. 9A to 9C, inclusive, are intended to show primarily the control circuits which are energized from a pair of terminals 201 and 202 from which there is derived a standard 115 volt alternating current power source.

Energization of the hydraulic pump motor supplies hydraulic fluid for the various hydraulic cylinders and is controlled by a stop button 203 in series with a start button 204 and a relay coil 205, the coil 205 having normally open contacts in the energizing lines to the polyphase hydraulic pump motor, and having a holding contact 206 across the start switch 204.

The ultrasonic cleaner tank 10 has a recirculation system for the fluid contained therein under the control of a relay coil 207, with a stop button 208 and a start button 209 in series therewith. The holding contact 210, operated by the relay coil 207 keeps its circuit energized when the start button 209 is released.

The dryer tank 11 shown in FIG. 1 includes a blower operated by a motor under the control of a relay coil 211 in series with a stop button 212 and a start button 213. A holding contact 214 under the control of the relay coil 211 is placed in parallel with the start switch 213.

The emulsifier solution in the tank 14 is recirculated by means of a pump driven by a motor under the control of a relay coil 215 in series with a stop button 216 and a start button 217. A holding contact 218 is in parallel with the start button 217 and is under the control of the relay coil 215.

The two drying sections 19 and 20 include a blower operated by a motor under the control of a relay coil 219 in series with a stop button 220 and a start button 221, with a holding contact 222 operated by the coil 219 being placed across the start button 221.

The dust collector system 22 includes a blower motor which is under the control of a relay coil 223 in series with a stop button 224 and a start button 225. A holding contact 226 operated by the relay coil 223 is in parallel with the start button 225.

The agitator means 15 shown in FIG. 1 is driven by a motor under the control of a relay coil 227 in series with a stop button 228 and a start button 229, with a holding contact 230 being provided under the control of the relay coil 227 to keep the circuit energized when the start button 229 is released. The agitators 17 in the agitator-dip rinse tank 16 are driven by a motor under the control of a relay coil 231 which is in series with a stop button 232 and a start button 233. A holding contact 234 is provided across the start button 233 and is controlled by the operation of the relay coil 231.

Water for the spray rinse in the tank 18 is recirculated by means of a pump driven by a motor which is under the control of a relay coil 235 in series with a stop button 236 and a start button 237. A holding contact 238 is provided across the start button 237 and is under the control of the relay coil 235.

Energization of the ultrasonic transducers in the cleaning tank 10 is under the control of a relay coil 239 in series with a stop button 240 and a start button 241, with a holding contact 242 being provided across the start button and under the control of the relay coil 239.

Relay contacts 243 through 252, inclusive, appear in the energizing circuits for the various motors which have heretofore been described. When all these motors are energized, and the ultrasonic generator is eneargized, it permits a control relay coil 253 to become energized. The control relay 253 has a contact 254 in series with the coil of a master control relay 255 and a master start button 256. A holding contact 257 operated from the relay coil 255 appears across the master start switch 256. A plurality of emergency stop switches 258 and 259 are also in series with the master relay coil 255.

A pair of contacts 260 and 261 in opposite sides of the line must be closed before power is applied to the remaining portions of the circuits, these relay contacts being under the control of the master relay coil 255.

When the carriage is in its extreme left position, the two sides of the carriage operate a pair of limit switches 262 and 263 whose closing energizes the control relay 264 (FIG. 9C). When this occurs, the relay coil 264 serves to close a pair of contacts 265 in series with a timer 266 and to close another set of contacts 267 on the other side of the timer. The timer controls the operation of three latch relays 268, 269 and 270 which, respectively, control the raising of the load and unload end of the machine, raising of the emulsifier station, and raising of the rinse station. Energizing the relay 268 serves to open a pair of normally closed contacts 271 in parallel with the contacts 265, and to close a pair of normally open contacts 272, thereby energizing a control relay 273. The latter also controls raising of the load and unload end of the machine. The contacts 265 and 267 are provided to assure that the various stations will not be raised except when the carriage is at the left end of its travel. The timer 266, however, starts its operation when the carriage is at its extreme right position. When this happens, the carriage trips a pair of limit switches 274 and 275 (FIG. 9B) to energize a control relay 276 which has a pair of normally open contacts 277 in series with an unlatch relay 278. The operation of the unlatch relay then serves to close the contacts 271 and initiate the operation of the timer 266 for the remainder of the four minute interval.

Energizing of the relay 268 also serves to close a pair of contacts 279. If the conveyor has been properly indexed to the next station, a pair of contacts 280 in series with contacts 279 will be closed, because the indexing of the monorail conveyor to the next station has closed a limit switch 281 which energizes a control relay 282 which, in turn, closes the contacts 280. Also in series with the contacts 279 and 280 are a pair of normally closed contacts 283 and 284. Contacts 283 are under the control of a relay 285 which is energized upon the closing of a limit switch 286, which limit switch is actuated when a new basket is lifted into its elevated position to begin its travel through the machine. Contacts 284 are under the control of a relay coil 287. Thus, if the conveyor has been indexed properly, and if the normally closed contacts 283 and 284 remain closed, the circuit is completed to a relay 288 in series with these contacts.

Relay 268 also operates to open a pair of normally closed contacts 289 in series with the relay coil 287. This line also has a pair of normally open contacts 290 controlled by operation of the relay 282 which, as explained, is governed by the positioning of the monorail conveyor. The circuit also includes a normally closed contact 291 which is under the control of a relay coil 292 in series with a limit switch 293 which is tripped when the load end of the first conveyor segment is down. Another normally closed contact 294 is in series with the relay contact 291 and is controlled by energization of the relay coil 288.

The relay coil 282 also controls the energization of a pair of normally open contacts 295 and closes the same when the monorail conveyor has been indexed. Contacts 295 are in series with another pair of normally open contacts 296 controlled by energization of the relay 268. These two contacts are in series with two sets of normally closed contacts 297 and 298, the former being under the control of a relay coil 311 and the latter being under the control of a relay coil 299. When contacts 295 and 296 are closed, and contacts 297 and 298 are closed, a relay 300 is energized to operate a solenoid valve in an hydraulic system which ultimately raises the unload end at the discharge end of the conveyor mechanism.

The lowering of the unload end of the conveyor is accomplished under the control of relay coil 299. This coil is in series with a normally closed set of contacts 301 under the control of relay coil 268, a set of normally open contacts 302 under the control of the monorail conveyor indexing relay 282, a pair of normally closed contacts 303 whose operation is controlled by a relay 304, and normally closed contacts 308 controlled by relay coil 300. The relay 304 is energized when the limit switch 305 is actuated, this occurring when the unload station has reached its lowermost position. When the unload end is up, the limit switch 310 is tripped, thereby energizing a control relay 311. The control circuit for raising the emulsifier station includes a control relay 312. In series with this control relay are a pair of normally open contacts 313 controlled by relay coil 269, a pair of normally closed contacts 314 controlled by a relay coil 323 and a pair of normally closed contacts 315 under the control of a relay coil 316. The latter relay coil controls the lowering of the emulsifier station and includes, in its energizing circuit, a pair of normally closed contacts 317 controlled by the relay coil 269, and normally closed contacts 318 controlled by a relay coil 319 with which the limit switch 320 is in series. The limit switch 320 is tripped when the emulsifier station is down, while the limit switch 322 in series with the energizing coil 323 is tripped when the emulsifier station is up. Relay coil 331 controls the raising of the rinse station and includes in its energizing circuit a pair of normally open contacts 332 controlled by operation of the relay coil 270. The energizing line also includes a pair of normally closed contacts 333 under the control of a relay coil 334. The latter is in series with a limit switch 335 which is tripped when the rinse station is up. Normally closed relay contacts 333 are in series with normally closed contacts 336 controlled by a relay coil 337. This relay coil controls the operation of lowering the rinse station and includes in its energizing circuit a pair of normally closed contacts 338 which are controlled by the relay coil 270. In series with these normally closed contacts are a second pair of normally closed contacts 339 which are under the control of a relay coil 340. This relay coil is energized upon tripping of a limit switch 341 which occurs when the rinse station is down.

Movement of the carriage to the right is controlled by a relay 342 which is a latch-type relay. The energizing circuit for this relay includes normally open contacts 343 under the control of relay coil 285. A second pair of normally open contacts 344 in series with the contacts 343 is controlled by energization of the relay coil 323. Another set of normally open contacts 345 is under the control of the relay coil 334. A fourth set of relay contacts 346 is under the control of the relay coil 311. This arrangement assures that all of the stations will be in the up position before the carriage can move to the right. Energization of the relay coil 342 closes a pair of contacts 347 which are in the energizing circuit of a control relay 348.

A control relay 349 has its energizing coil in series with a pair of normally open contacts 350 controlled by energization of the latch relay 342. Normally open contacts 351 are under the control of relay coil 285, while normally open contacts 352 are under the control of relay coil 323. Normally open relay contacts 353 are under the control of relay coil 334, while normally open contacts 354 are under the control of relay coil 311. Normally open contacts 355 are under the control of the monorail conveyor control relay 282. Normally closed contacts 356 are under the control of relay coil 276 so that they remain closed any time the carriage is other than in its extreme right position. Normally closed relay contacts 357 are under the control of a relay coil 358 which controls movement of the carriage to the left.

In series with the relay coil 358 is a normally closed set of contacts 359 under the control of relay coil 342. Normally open contacts 360 are controlled by energization of the relay coil 319, while normally open contacts 362 are under the control of relay coil 340. Normally open contacts 363 are closed when relay coil 304 is energized. Normally open contacts 364 are closed when coil 282 is energized. Normally closed contacts 365 are opened upon energization of relay coil 264 which occurs when the carriage reaches its extreme left position. Normally closed contacts 366 are under the control of relay coil 349.

The start of the monorail conveyor indexing is under the control of an unlatch relay 367 which is in series with the relay contacts 277 under the control of relay coil 276 and with a set of normally open contacts 368 controlled by energization of the relay coil 285. Energization of the relay coil 367 serves to unlatch normally closed contacts 369 which are normally under the control of a latch-type relay 370.

The control of the duration of spraying of penetrant which occurs in the tank 12 is done by means of a timer 372. This timer is arranged to commence its running time when the load end of the machine is down, to close a timer operated switch 373 and thereby energize a contactor 374 which energizes a motor which operates a pump to introduce liquid penetrant into the spray heads in the tank 12. The timer 372 is in series with a set of normally closed contacts 375 which are controlled by the relay 273. Also in series with the timer are a pair of normally open contacts 376 under the control of the latch relay 342. A second set of normally open contacts 377 in the same line is under the control of relay 292. Typically, the timer motor may be set to operate the timer for a period of 20 seconds or so. Across the controller 374 is a relay 378 which energizes a solenoid valve to control oscillation of the spray heads which apply the penetrant.

The monorail conveyor movement is controlled in part by a contactor 379 having contacts (not shown) in the energizing leads to the motor which drives the monorail conveyor system. The energizing circuit for the contactor 379 includes a set of normally closed relay contacts 380 under the control of relay 273, a set of normally closed contacts 381 under the control of relay 282, a set of normally open contacts 382 controlled by operation of the relay 292, and a set of normally open contacts 383 under the control of a relay 304. Across the relay contacts 381 is the combination of the aforementioned normally closed relay contacts 369 controlled by the relay 370 and a set of normally open contacts 384 under the control of relay 348. Also in series with the relay 370 is a pair of normally open contacts 385 controlled by a relay 386. The latter is in series with a limit switch 387 which is tripped when the monorail conveyor has moved approximately one foot beyond its indexed position.

Oscillation of the water rinse spraying devices in the rinse tank 18 is accomplished in the correct timed relation by a circuit including a relay 388 which is energized through a circuit including a normally closed set of relay contacts 389 operated by relay 273, a set of normally open contacts 390 operated by relay 348, a set of normally open contacts 391 controlled by a relay 304, and a normally closed set of contacts 392 under the control of a relay 393. A timer 394 and a relay 393 are in parallel to the normally closed contacts 392 and the relay 388, and in series with a set of normally open contacts 395 controlled by the operation of relay 388. The timer 394 starts timing when the unload end of the machine is down to control spraying duration in the spray rinse tank 18 with recirculated water. It is, of course, possible to combine spraying with recirculated water and spraying with fresh water if so desired.

Application of the dry developer as a powder in the tank 21 is under the control of a timer 396 and a relay 397. The timer 396 starts timing when the unload end of the machine is down to apply the dry developer as a cloud in the tank 21 until the timer runs out, which typically may be an interval of about 20 seconds.

Control of lowering of the articles into the emulsifier station, and thereby control of the emulsifier application time is accomplished through a timer 398 in series with an unlatch relay coil 399 which operates to release the contacts latched by latch relay 269. In series with the timer 398 and the unlatch relay 399 is a normally open set of contacts 400 which is under the control of relay 276. The timer 398 starts timing when the carriage has reached its extreme right position and then serves to initiate lowering of the test pieces into the emulsifier tank after an interval determined by the setting of the timer 398.

Lowering of the articles into the rinse station is under the control of a timer 401 and an unlatch relay 402 which operates the unlatch coil of relay 270. A normally closed set of contacts 403 controlled by the relay 273 and a normally open set of contacts 404 controlled by the relay 276 complete the energizing circuit. Timer 401 also starts timing when the carriage is in its extreme right position to determine the time at which the articles are immersed in the spray rinse bath.

In the dip rinse station 16, it is desirable to introduce air into the wash water to achieve effective agitation. The control of the air introduction is accomplished by the inclusion of a timer 406 and a relay 407, with the energizing circuit being completed through a pair of normally open contacts 408 under the control of relay 348 and normally open contacts 409 under the control of relay 340. The timer 406 starts timing when the rinse station is down, and the rinse water is agitated with air until the timer runs out which is typically after an interval of one minute or so.

The last movement in the overall cycle is a retraction of the carriage to the left as viewed in FIGURE 1 to commence a new cycle. This movement is controlled by an unlatch relay 410 which operates to unlatch the contacts held by relay 342. The energizing circuit for relay 410 is completed through a pair of contacts 411 controlled by relay 292, a pair of normally open contacts 412 controlled by relay 319, a pair of normally open contacts 413 under the control of relay 340, a set of normally open contacts 414 under the control of relay 304, a set of normally closed contacts 415 under the control of relay 269, and a set of normally closed contacts 416 under the control of relay 270. With this arrangement, all of the work holders must be in their lowered position before the carriage is permitted to move left.

Turning now to the relationship between the electrical system and the hydraulic and pneumatic systems, from FIG. 9C it will be seen that a solenoid 417 is provided to control the introduction of fluid into the cylinder 116 which controls raising of the load end of the machine. This solenoid 417 is operated whenever contacts 418 and 419, controlled by the relay 288, are closed. The load end is lowered with the operation of a solenoid valve operation of a solenoid valve operator 418 under the control of relay contacts 420 and 421 operated by relay coil 287. Of course, solenoids 417 and 418 can be combined with a single double-ended cylinder unit.

The unload end of the machine is raised at the unload station by the operation of a solenoid valve actuator 422 when relay contacts 423 and 424, both under the control of relay 300, are closed. Similarly, a solenoid valve actuator 425, actuated by the closing of contacts 426 and 427 under the control of relay 299, serves to lower the unload end.

Raising of the emulsifier station is accomplished through the use of a solenoid valve actuator 428 which is energized when contacts 429 and 430 are closed, these contacts being under the control of relay 312. Lowering of the emulsifier station at the appropriate time is a function of the solenoid valve actuator 431 which is energized when contacts 432 and 433 both under the control of relay 316 are closed.

Raising of the rinse station is accomplished through the actuation of the solenoid valve actuator 434 which is energized when two pairs of contacts 435 and 436 under the control of relay 331 are closed. Lowering of the rinse station is accomplished by means of a solenoid 437 when contacts 438 and 439 are closed by the operation of relay 337.

Movement of the carriage to the right by introduction of fluid into the cylinders 64 and 65 is controlled by a solenoid valve actuator 440 which operates whenever contacts 441 and 442 controlled by relay 349 are closed. Similarly, solenoid valve actuator 443 serves to introduce pressurized fluid in the opposite end of the cylinders 64 and 65 whenever contacts 444 and 445 are closed, these being under the control of relay 358.

Solenoid valve actuator 446 introduces compressed air into the penetrant spray oscillation system whenever contacts 447 and 448 are closed, these contacts being controlled by relay 378. Agitation of the liquid in the dip rinse station 16 is under the control of a solenoid valve actuator 449 which permits the introduction of air into the tank whenever contacts 450 and 451 are closed. These contacts are closed by energization of the relay 407.

Oscillation of the spray rinse device in the spray rinse station 18 is also pneumatically controlled, utilizing a solenoid valve actuator 452 which operates when contacts 453 and 454 are closed by the energization of relay 388. Finally, a dry developer application in the dry developer tank 21 is controlled by a solenoid valve actuator 455 which is energized when contacts 456 and 457 under the control of relay 397 are closed.

To recapitulate the operation of the device, at the beginning of the cycle, tower 51 is located directly over tank 10, so that lifting arms 31 and 32 are in a position to raise the rack 27 which is in the load position. Referring to the motion chart of FIG. 8, during the first fifteen seconds of the overall cycle, all of the lifting arms are elevated, so that the rack at the loading end is raised from the monorail conveyor by the lifter arms 31 and 32, lifter arms 34 and 39 raise the rack which has theretofore been resting in the ultrasonic cleaner tank 10, lifter arms 35 and 40 raise the rack which had previously been in the dryer 11, and lifter arms 36 and 41 raise the rack which had previously been in the spray penetrant tank 12. Tower 52, at the initiation of the cycle, is moved to the left hand end of the penetrant drain tank 13 and the lifter arms 37 and 42 pick up the rack which had been draining in this portion.

Tower 74 at the beginning of the cycle is located at the right end of the penetrant drain tank 13 and its lifter arms 142 then engage the rack which is in that portion and raise it above the level of the tank. Tower 75, at the beginning of the cycle is positioned over the emulsifier dip tank 14 and its lifter arms 157 engage and lift the rack contained in the emulsifier dip tank 14 above the level of that tank.

At the initiation of the cycle, lifter arms 81 and 86 are disposed about the agitator and dip rinse section 16 so that they pick up the rack which had been resting in that tank. Lifter arms 82 and 87 engage the rack which was located in the spray rinse tank 18, and lifter arms 83 and 88 are in position to lift the rack which was contained in the dryer 19. The tower 77, at the beginning of the cycle, is located over the dryer 20 and lifter arms 84 and 89 are accordingly in position to lift out the rack contained in the dryer section. Lifter arms 85 and 90 are then located over the dry developer tank 21 in position to lift out the rack contained therein and to deliver it to the unload end of the machine. When all of the racks have been lifted, the carriage is set in motion to the right so that each set of lifter bars moves its rack to the next station or, in the case of the penetrant drain station, to a position further along in the tank. Then, the various racks are lowered into the tanks or unloaded from the unload end as the case may be, the racks coming to rest on the tanks free of support by the lifting arms. In the case of the emulsifier and dip rinse sections, however, due to the variable treatment time capability, the racks to be treated in those stations may be held in an elevated position until the required time has elapsed, whereupon they are then lowered into the respective stations.

The next event is the indexing of the monorail conveyor to bring a new rack into the loading position and finally, the entire carriage is moved to the left back to the original starting position for the commencement of another cycle.

It should be evident that various modifications can be made to the described embodiments without departing from the scope of the present invention.

We claim as our invention:

1. An apparatus for continuously processing articles by the penetrant inspection process comprising the following zones in sequence:
   (1) a penetrant application zone,
   (2) a penetrant draining zone,
   (3) an emulsifier application zone,
   (4) a rinsing zone,
   (5) a drying zone, and
   (6) a developer application zone,
   said zones (1) to (6), inclusive, being arranged in a straight line sequence,
   conveyor means disposed in circumscribing relation to zones (1) to (6) for delivering articles to and removing articles from said apparatus,
   lifter means in each of said zones arranged to support articles within each zone,
   a reciprocating carriage associated with each zone and having pickup means arranged to pick up the lifter means and transport them to the next succeeding zone,
   first actuating means for jointly moving the reciprocating carriages for all zones during one portion of a predetermined time interval,
   second actuating means arranged to lower jointly the pickup means in zones (1), (2), (5) and (6), and thereby immerse articles simultaneously in said zones, and
   third actuating means independently controlling the actuation of the pickup means in zone (3) to thereby control the immersion time of articles in zone (3).

2. The apparatus of claim 1 in which said developer application zone has means therein for forming a cloud of dry developer particles.

3. The apparatus of claim 1 which includes fourth actuating means independently controlling the actuation of the pickup means in zone (4) to thereby control the immersion time of articles in zone (4).

4. The apparatus of claim 1 including a cleaning zone preceding said penetrant application zone.

5. The apparatus of claim 1 in which said third actuating means operates to immerse the pickup means in zone (3) for a shorter interval than in the others of said zones.

(References on following page)

References Cited

UNITED STATES PATENTS

| | | |
|---|---|---|
| 2,848,405 | 8/1958 | Lisowski et al. _____ 204—203 |
| 3,074,418 | 1/1963 | Davis et al. _____ 134—66 X |
| 3,102,630 | 9/1963 | De Back _____ 198—78 |
| 3,193,121 | 7/1965 | Kumpf et al. _____ 134—61 X |
| 3,382,844 | 5/1968 | Kumpf _____ 118—425 X |

FOREIGN PATENTS 933,896  8/1963  Great Britian.

OTHER REFERENCES

Magnaflux ad—Zyglo Pentrex, pp. 12, 13, 14, 15, Oct. 21, 1957.

RICHARD C. QUEISSER, Primary Examiner

E. J. KOCH, Assistant Examiner

U.S. Cl. X.R.

118—9

UNITED STATES PATENT OFFICE
CERTIFICATE OF CORRECTION

Patent No. 3,509,762          Dated May 5, 1970

Inventor(s) Edward F. Conway and Kenneth F. Conner

It is certified that error appears in the above-identified patent and that said Letters Patent are hereby corrected as shown below:

Column 1, line 33, "preceded" appears instead of --proceeded--.

Column 1, line 45, "slated" appears instead of --stated--.

Column 6, line 2, "on" appears instead of --one--.

SIGNED AND
SEALED
DEC 8 1970

(SEAL)
Attest:

Edward M. Fletcher, Jr.
Attesting Officer

WILLIAM E. SCHUYLER, JR.
Commissioner of Patents